(12) United States Patent
Agogino et al.

(10) Patent No.: US 10,630,208 B2
(45) Date of Patent: Apr. 21, 2020

(54) DNA STRUCTURED LINEAR ACTUATOR

(71) Applicant: THE REGENTS OF THE UNIVERSITY OF CALIFORNIA, Oakland, CA (US)

(72) Inventors: Alice Agogino, Berkeley, CA (US); Kyle Zampaglione, San Jose, CA (US); Lee-Huang Chen, Anaheim, CA (US); Andrew P. Sabelhaus, Berkeley, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 233 days.

(21) Appl. No.: 15/814,176

(22) Filed: Nov. 15, 2017

(65) Prior Publication Data
US 2018/0138832 A1 May 17, 2018

Related U.S. Application Data

(63) Continuation of application No. PCT/US2016/032899, filed on May 17, 2016.
(Continued)

(51) Int. Cl.
*F16H 19/06* (2006.01)
*H02N 2/04* (2006.01)
(Continued)

(52) U.S. Cl.
CPC .............. *H02N 2/04* (2013.01); *B25J 9/10* (2013.01); *B25J 17/0208* (2013.01);
(Continued)

(58) Field of Classification Search
CPC .............................. F16H 19/0654; B25J 9/104
See application file for complete search history.

(56) References Cited

U.S. PATENT DOCUMENTS 4,843,921 A * 7/1989 Kremer .................... A61F 2/54
74/89.2
9,574,646 B1 * 2/2017 Edsinger ................ F16H 21/16
(Continued)

FOREIGN PATENT DOCUMENTS

EP   1320178 A1   6/2003
JP   2008079371 A   4/2008
(Continued)

OTHER PUBLICATIONS

Korean Intellectual Property Office (KIPO), International Search Report and Written Opinion dated Aug. 24, 2016, counterpart PCT international application No. PCT/US2016/032899, pp. 1-10, with claims searched, pp. 11-15.

*Primary Examiner* — William Kelleher
*Assistant Examiner* — Gregory T Prather
(74) *Attorney, Agent, or Firm* — O'Banion & Ritchey LLP; John P. O'Banion

(57) ABSTRACT

A DNA-structured linear actuator comprised of a ladder-like structure that twists to generate linear motion. In its base state, the DNA structured linear actuator best resembles a rope ladder. When this ladder is twisted, it takes on the appearance of a DNA double-helix structure. By application of a torsional force on one end, the ladder-like structure extends or contracts to allow linear translation of one end of the structure.

19 Claims, 3 Drawing Sheets

Related U.S. Application Data

(60) Provisional application No. 62/163,462, filed on May 19, 2015.

(51) Int. Cl.
    *B25J 9/10*     (2006.01)
    *B25J 17/02*     (2006.01)
    *H02K 29/03*     (2006.01)
    *H02K 1/14*     (2006.01)

(52) U.S. Cl.
    CPC ......... *F16H 19/0654* (2013.01); *H02K 1/143* (2013.01); *H02K 1/146* (2013.01); *H02K 29/03* (2013.01); *H02K 2213/03* (2013.01)

(56) References Cited

U.S. PATENT DOCUMENTS

| | | | | |
|---|---|---|---|---|
| 10,254,499 B1* | 4/2019 | Cohen | ................... | B33Y 70/00 |
| 2004/0061382 A1 | 4/2004 | Schreier | | |
| 2007/0164635 A1* | 7/2007 | Witteveen | ............... | G02B 7/005 |
| | | | | 310/323.01 |
| 2008/0066574 A1* | 3/2008 | Murata | ..................... | A61F 2/68 |
| | | | | 74/826 |
| 2008/0077258 A1* | 3/2008 | Shoham | ................... | B25J 9/104 |
| | | | | 700/90 |
| 2009/0249903 A1* | 10/2009 | Godler | ................ | F16H 19/0654 |
| | | | | 74/89.2 |
| 2013/0345516 A1* | 12/2013 | Kindler | ................ | A61B 1/0057 |
| | | | | 600/145 |
| 2014/0035306 A1* | 2/2014 | Garcia | ................ | B25J 15/0009 |
| | | | | 294/213 |
| 2014/0277739 A1* | 9/2014 | Kornbluh | ................ | B25J 9/0006 |
| | | | | 700/260 |
| 2015/0369264 A1* | 12/2015 | Felt | ....................... | F15B 15/103 |
| | | | | 92/90 |
| 2017/0056118 A1* | 3/2017 | Cooper | ................... | A61B 34/71 |
| 2018/0031087 A1* | 2/2018 | Schreiber | ............ | F16H 19/0654 |
| 2018/0188121 A1* | 7/2018 | Ono | ............................ | G01L 1/16 |
| 2018/0297209 A1* | 10/2018 | Low | ................... | G06K 9/00664 |
| 2018/0298996 A1* | 10/2018 | Ryu | ......................... | G01D 5/12 |
| 2019/0054638 A1* | 2/2019 | Norton | ..................... | B25J 18/06 |

FOREIGN PATENT DOCUMENTS

| | | |
|---|---|---|
| JP | 2011188636 A | 9/2011 |
| KR | 1020010113263 | 12/2001 |

* cited by examiner

DNA STRUCTURED LINEAR ACTUATOR

CROSS-REFERENCE TO RELATED APPLICATIONS

This application is a 35 U.S.C. § 111(a) continuation of PCT international application number PCT/US2016/032899 filed on May 17, 2016, incorporated herein by reference in its entirety, which claims priority to, and the benefit of, U.S. provisional patent application Ser. No. 62/163,462 filed on May 19, 2015, incorporated herein by reference in its entirety. Priority is claimed to each of the foregoing applications.

The above-referenced PCT international application was published as PCT International Publication No. WO 2016/187211 on Nov. 24, 2016, which publication is incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

This description pertains generally to actuators, and more particularly to linear actuators.

2. Background Discussion

Linear motion is an essential mechanical property in many applications. Currently there are a variety of ways of creating linear motion including screw, cam, rotating pulley, hydraulic, and pneumatic actuation. While these are all valid methods of generating linear motion, each of these methods has its own issues, resulting in niche applications for each. The main issues with linear actuation methods are cost, scale, speed, and efficiency. While there are a wide variety of actuators to choose from, close examination will reveal that nearly all are only strong in 1 or 2 categories of overall performance.

One class of linear actuators is called twisted string actuators (TSAs). These actuators are comprised of strings or wires fixed to a rotating disc on a motor. When the wires are twisted, the overall length of the structure decreases, creating linear motion. The radius decreases as the strings are twisted together, resulting in an increase in gear ratio. These actuators are noteworthy for their lightweight construction, simplicity, and flexibility. The main disadvantages of TSAs are their non-linear response in length change and torque, and their limited change in overall length of the actuator.

Other current alternatives are screw-based linear actuators and rotating pulley actuators. Screw based actuators tend to be heavy, require large amounts of space, are rigid, slow and are generally expensive.

Accordingly, an object of the present description is a linear actuator that has one or more of the following attributes: inexpensive, fast, scalable and efficient.

BRIEF SUMMARY

The present disclosure describes a linear actuator having a physical structure similar to that of DNA, and which is configured to provide significant advantages in cost, scale, speed, and efficiency, becoming one of the only actuators to level across these fields. Additionally, its unique structure lends itself to be a compliant actuator, which is particularly beneficial for interactive robotics.

In one embodiment, the DNA-structured linear actuator is comprised of a ladder-like structure that twists to generate linear motion. The ladder structure provides fast and efficient actuation, while also keeping costs down. The simple form is also scalable in size, for a variety in loads, in geometry, and length-to-twist ratio. Thus, the DNA-structured linear actuator of the present description is strong in all performance categories (cost, scale, speed, and efficiency).

In its base state, the DNA structured linear actuator best resembles a rope ladder. When this ladder is twisted, it takes on the appearance of a DNA double-helix structure. The actuation has very simple operation: by twisting from an end, the structure extends or contracts.

Further aspects of the technology will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

DETAILED DESCRIPTION

Figure 1:
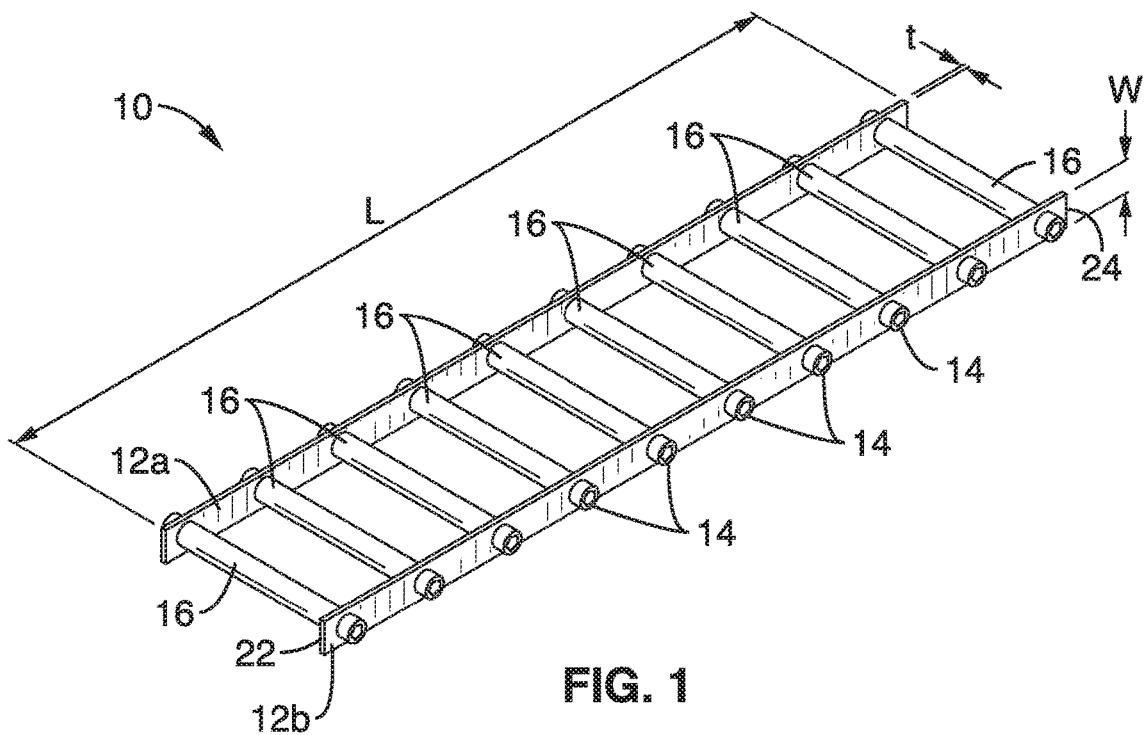
FIG. 1 is a schematic perspective view of the DNA-structured linear actuator of the present description.

FIG. 1 shows a schematic perspective view of the DNA-structured linear actuator 10 of the present description. FIG.

2 is an exploded assembly view of the DNA-structured linear actuator 10. The linear actuator 10 comprises a ladder-like structure that when twisted along its length resembles a strand of DNA. The actuator 10 comprises a pair of elongate, flexible planar rails (12a, 12b) that are spaced apart by distance d via a plurality of cylindrical rungs 16.

The rungs 16 are attached to the rails 12a, 12b via a plurality of fasteners 14 at spaced-apart locations on the rails 12a, 12b. Each of the rungs 16 has a first end coupled to the first rail 12a and a second end coupled to the second rail 12b such that the first and second rails 12a, 12b are spaced apart parallel to each other to form a ladder-like structure having a first rail end 22 and a second rail end 24 with a rail length L established at points between rail ends 22, 24. The rails 12a, 12b shown in FIG. 1 and FIG. 2 are depicted as rectangular sheets having a relatively thin thickness t, a width, w, much smaller than length, L.

Figure 2:
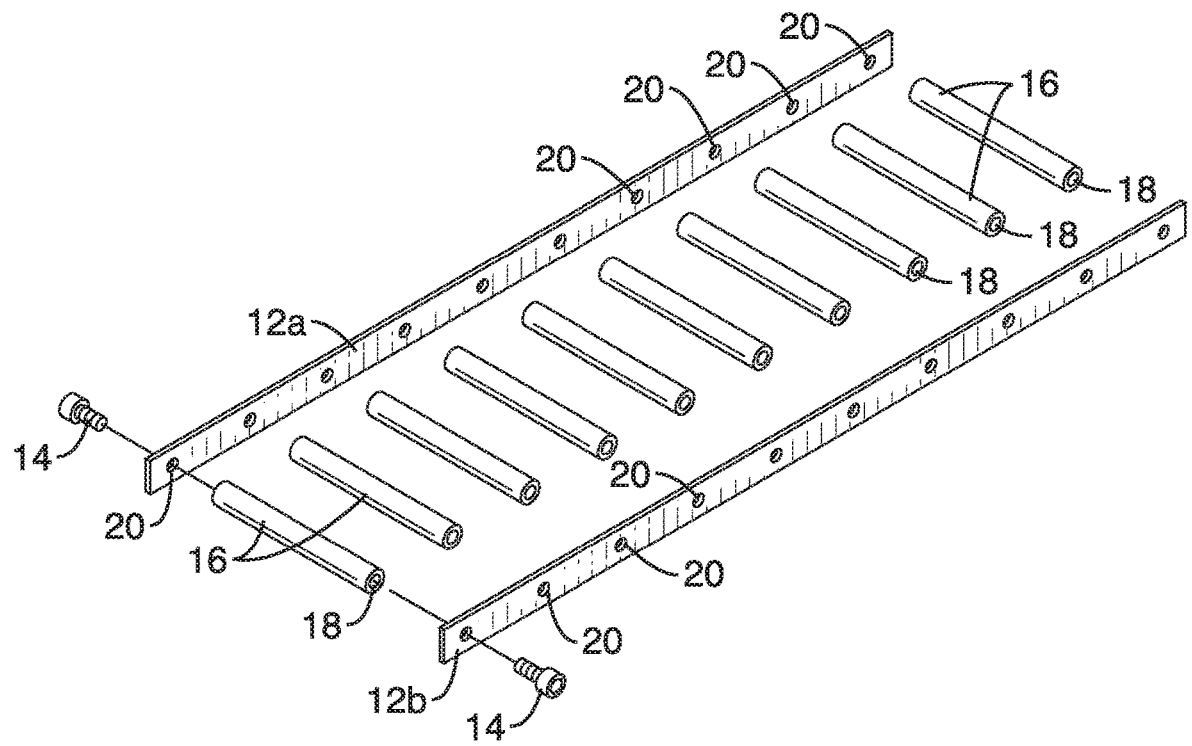
FIG. 2 is an exploded assembly view of the DNA-structured linear actuator of FIG. 1.

In one embodiment shown in FIG. 1 and FIG. 2, the fasteners comprise bolts 14 that secure into apertures 18 in the rungs 16 (either press fit or thread) through a plurality of spaced-apart holes 20 in the rails. It is appreciated that the fastening scheme illustrated in FIG. 1 and FIG. 2 is one of many fastening options for securing the rungs 16 to the rails 12a, 12b. For example, rungs 16 may be fastened via rivets, or may be press-fit into a larger through-hole 20 of the rails 12a, 12b, or other fastening means. In a preferred embodiment where screw fasteners 14 are used, it is preferable that the fasteners 14 are not fully tightened. By maintaining loose contact between rails 12a, 12b and rungs 16, the rungs 16 are free to rotate with respect to the rails 12a, 12b.

Figure 3A:
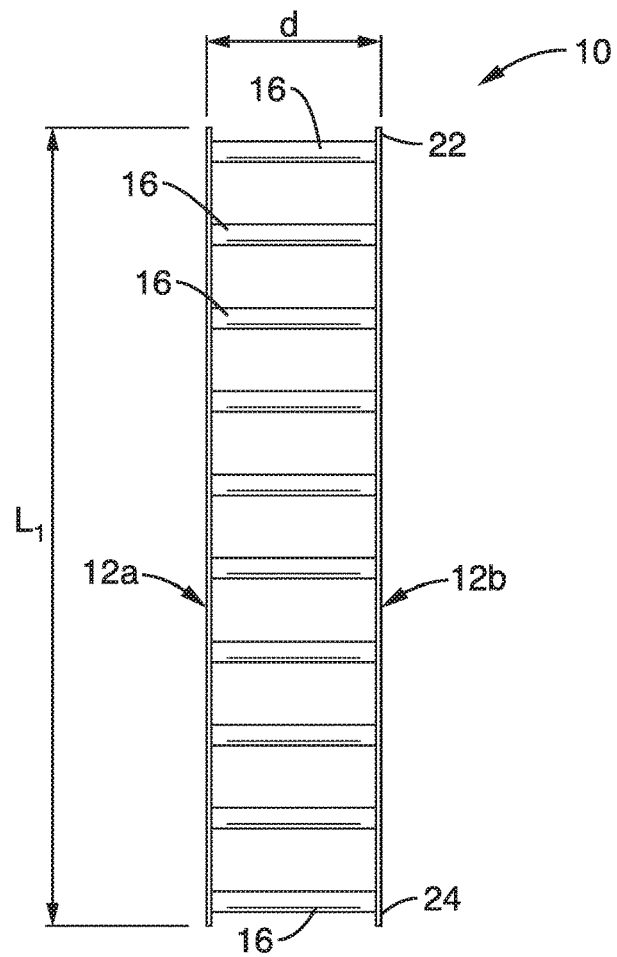
FIG. 3A is a side view of the DNA-structured linear actuator of FIG. 1 in an expanded-free state.

FIG. 3A is a side view of the DNA-structured linear actuator 10 in an expanded free state. The actuator 10 has a base or free-state rail length $L_1$, and the rails are spaced apart by the rung length d. A torsional load T may be placed on rail ends 22, 24 of the actuator 10 to generate linear actuation. It is also appreciated that the rungs 16 and rails 12a, 12b may vary as to size and shape. For example the rungs 16 are shown as cylinders (circular cross-section) and rails 12a, 12b are shown as planar (rectangular cross-section). However, other cross-sectional, shapes, geometrical configurations, weight relieving, etc. may be employed where appropriate.

Figure 3B:
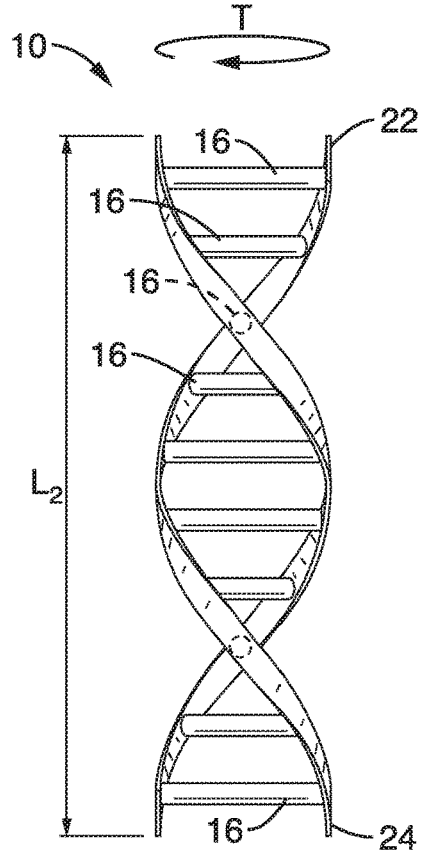
FIG. 3B is a side view of the DNA-structured linear actuator of FIG. 1 in a semi-compressed state after one rotation.

FIG. 3B is a side view of the DNA-structured linear actuator 10 in a semi-compressed state after one rotation. The actuator 10 has a semi-compressed length $L_2$ and exhibits a double helix shape from the torsional load T that acts on ends 22 and 24 to twist the actuator 10, resulting in shortening of the rail length to $L_2$.

Figure 3C:
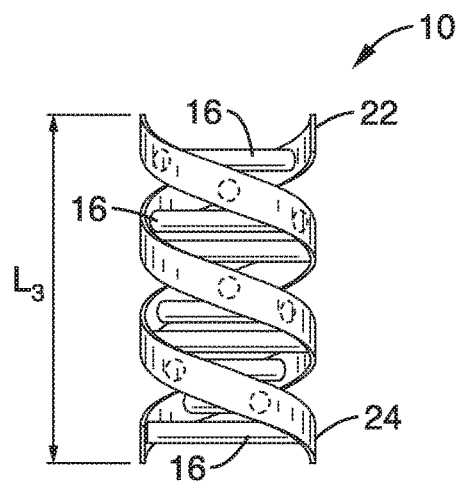
FIG. 3C is a side view of the DNA-structured linear actuator of FIG. 1 in a compressed state after one and a half rotations.

FIG. 3C is a side view of the DNA-structured linear actuator 10 in a fully-compressed state after one and a half rotations. The actuator 10 has a compressed length $L_3$ and exhibits a more compressed double-helix shape from the torsional load T acting on ends 22 and 24, resulting in shortening of the rail length to $L_3$.

It is appreciated that the 3 states shown in FIG. 3A to 3C are shown for exemplary purposes only, and the any number of states between lengths $L_1$ and $L_3$ may be incrementally achieved based on the corresponding rotation of rail end 22 with respect to rail end 24.

With respect to linear displacement, the actuator 10 may be sized so that a much larger or smaller overall length of displacement can be achieved, and the gearing ratio is easily tuned by changing the width of the structure 10, e.g., providing rungs 16 of different length "d".

The rails 12a, 12b are preferably constructed of a flexible or compliant material (e.g. elastomers, various plastics, flexible steels such as spring steel, and shape memory metals such as Nitinol that exhibit large elastic deformation ranges) at a specified thickness, t, to provide repeatable torsional deformation of the actuator 10 into the DNA double-helix formation shown in FIG. 3B. In a preferred embodiment, the rungs 16 are preferably formed a rigid or semi-rigid construction and/or material selection that result in a lesser or no deformation of the rungs when the structure is placed in torsion. This preferred embodiment uses a stiff material (aluminum) for the rungs and a flexible material (spring steel) for the rails.

The rate at which extension or contraction occurs is a function of the distanced between rungs 16 of the ladder-like structure 10. In general, the DNA actuator has a fast length displacement relative to the number of input turns. The simplicity in powering the structure using a single in-line mounted drive motor (not shown) disposed at either rail end 22, 24, which makes it an efficient actuator.

Figure 4:
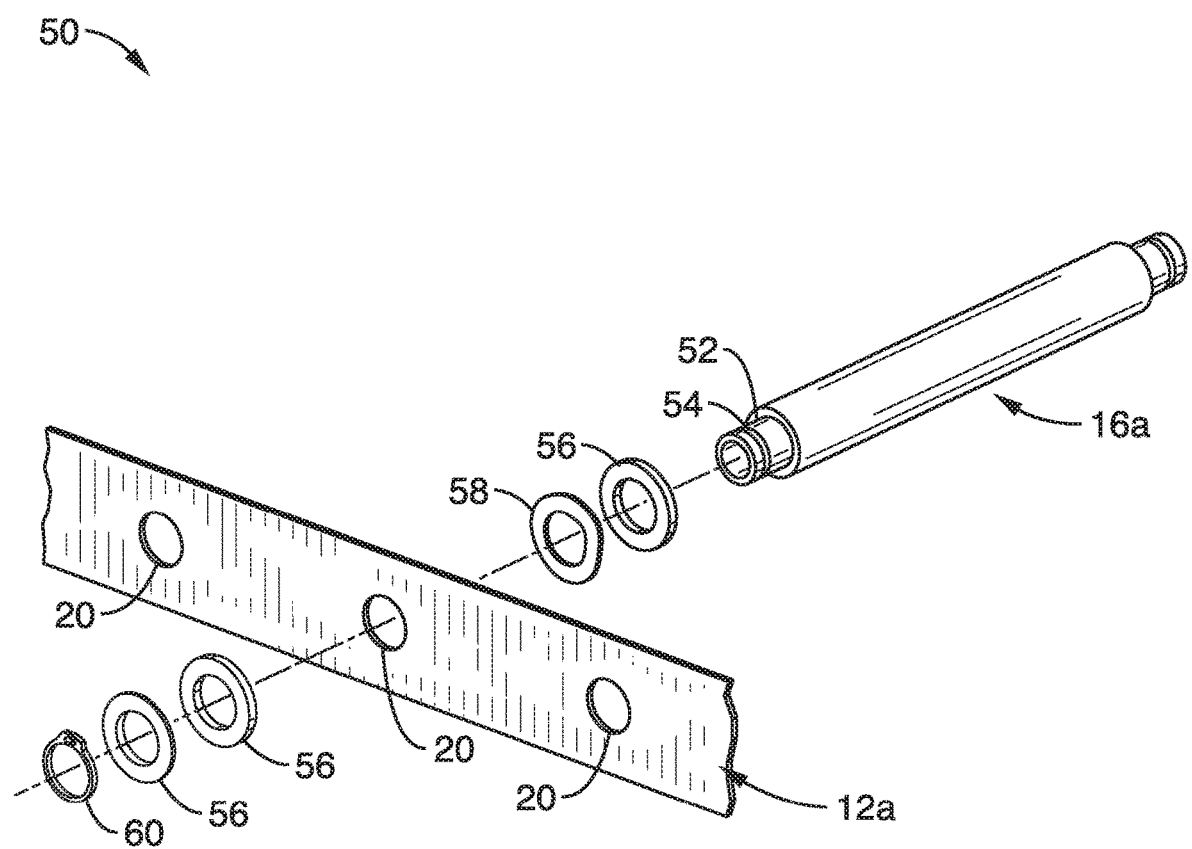
FIG. 4 shows a perspective view of an alternative fastening configuration in accordance with the present description.

FIG. 4 shows a perspective view of a DNA-structured linear actuator 50 using an alternative fastening configuration in accordance with the present description. For purposes of clarity, rail 12b is omitted from illustration. Linear actuator 50 uses a plurality of shims 56 and a wave spring 58 to allow for adjustment of the amount of "play" between rungs 16a and rails 12a, 12b. The amount of play allows for the rungs 16a to spin freely with respect to the rails 12a, 12b, which is particularly advantageous during rotation/contraction of the structure. The ends of rungs 16a have a shoulder 52 over which shims 56, wave spring 58 and aperture 20 of rail 12a, 12b are positioned. The assembly is retained in place by a snap ring 60, or like fastener, that secures into groove 54 of shoulder 52.

The DNA actuator 10 is cheap to manufacture, as it is made of only a few, repeated components, making it a practical alternative to many standard actuators. The DNA actuator 10 is also scalable for large or small applications by simply changing the size of the ladder rungs 16.

In comparison to TSAs, the DNA actuator 10 takes far fewer twists to generate a linear displacement. Furthermore, a much larger overall length displacement can be achieved, and the gearing ratio is easily tuned by changing the width of the structure.

In comparison to screw based linear actuators and rotating pulley actuators, the DNA actuator 10 is lightweight, flexible, cheap to manufacture, and does not require much space for actuation. In these terms, it has a clear advantage over a screw based actuator.

The DNA actuator 10 also shares advantages (e.g. flexible, easy to scale, and generally lightweight) of rotating pulley actuators, which simply extend and retract spooled cable. The disadvantages of a rotating pulley actuator are that the motor is usually mounted perpendicular to the drive direction, increasing the actuator's footprint, and they can be inaccurate due to uneven spooling of cable, and require a lot of application specific design to provide reliability. The DNA actuator 10 has a smaller footprint, and does not require as much application specific design to ensure reliability.

The DNA actuator 10 of the present description can be used in any system that requires linear motion. The DNA actuator 10 is especially suited for systems that have tight space confines, need a large degree of displacement at a high rate, and are price constrained. The actuator can be used in any orientation, preferably with a pre-load on the actuator. The DNA actuator 10 is well suited for applications that require compliant actuation, such as interactive robotics. The "springiness" of the actuator's structure allows it to interact with an environment in a soft, conformable way while still maintaining memory of its current length.

The DNA actuator is particularly useful for use in systems with relatively low-load requirements, depending on the material construction. The actuator 10 can be made to handle large loads through extended design.

From the description herein, it will be appreciated that that the present disclosure encompasses multiple embodiments which include, but are not limited to, the following:

1. A linear actuator, comprising: first and second elongate, compliant rails; and a plurality of rungs disposed perpendicular to and in between the first and second rails; wherein each of the plurality of rungs has a first end coupled to the first rail and a second end coupled to the second rail such that the first and second rails are spaced apart parallel to each other to form a ladder-like structure having a first rail end and a second rail end and a rail length there between; and wherein application of a torsional force on either the first rail end or second rail end to rotate of the first rail end with respect to the second rail end deforms the first and second rails such that they form a double-helix structure to shorten the rail length of the ladder-like structure.

2. The linear actuator of any preceding embodiment, wherein the first and second rails comprise elongate planer sheets having a width much smaller than the length, and a thickness configured to allow elastic torsional deformation of the rails upon application of a torsional force.

3. The linear actuator of any preceding embodiment, wherein the rails comprise a compliant material to allow for elastic torsional deformation of the rails upon application of a torsional force.

4. The linear actuator of any preceding embodiment, wherein the plurality of rungs comprise substantially rigid structures.

5. The linear actuator of any preceding embodiment: wherein the first and second rails comprise through holes at the locations of the plurality of rungs; and wherein a plurality of fasteners are disposed into the through holes to attach the rungs to the first and second rails.

6. The linear actuator of any preceding embodiment, wherein an amount of shortening of the rail length per rotation of the first end with respect to the second end is tunable by modifying the length of the plurality of rungs.

7. The linear actuator of any preceding embodiment, wherein the plurality of rungs comprise cylindrical members.

8. The linear actuator of any preceding embodiment, wherein the each of the plurality of rungs comprises an aperture at each end for receiving one of the plurality of fasteners.

9. The linear actuator of any preceding embodiment, wherein the rail length is configured to be incrementally shortened upon increasing amounts of rotation of the first rail end with respect to the second rail end.

10. A linear actuator, comprising: a first rail separated from a second rail by a plurality of rungs; wherein each of the plurality of rungs has a first end coupled to the first rail and a second end coupled to the second rail such that the first and second rails are spaced apart parallel to each other to form a ladder-like structure having a first rail end and a second rail end, the first rail end and a second rail end establishing a rail length there between; wherein the ladder-like structure comprises a first free state comprising a first rail length and a second compressed state comprising a second rail length smaller than the first rail length; and wherein the rails are compliant such that application of a torsional force on either the first rail end or second rail end in the first free state to rotate of the first rail end with respect to the second rail end deforms the first and second rails such that they compress into a double-helix structure having the second rail length.

11. The linear actuator of any preceding embodiment, wherein the first and second rails comprise elongate planer sheets having a width much smaller than the length, and a thickness configured to allow elastic torsional deformation of the rails upon application of a torsional force.

12. The linear actuator of any preceding embodiment, wherein the rails comprise a compliant material to allow for elastic torsional deformation of the rails upon application of a torsional force.

13. The linear actuator of any preceding embodiment, wherein the plurality of rungs comprise substantially rigid structures.

14. The linear actuator of any preceding embodiment: wherein the first and second rails comprise through holes at the locations of the plurality of rungs; and wherein a plurality of fasteners are disposed into the through holes to attach the rungs to the first and second rails.

15. The linear actuator of any preceding embodiment, wherein an amount of shortening between the first length and second rail length per rotation of the first end with respect to the second end is tunable by modifying the length of the plurality of rungs.

16. The linear actuator of any preceding embodiment, wherein the plurality of rungs comprise cylindrical members.

17. The linear actuator of any preceding embodiment, wherein the each of the plurality of rungs comprises an aperture at each end for receiving one of the plurality of fasteners.

18. The linear actuator of any preceding embodiment, wherein the rail length incrementally decreases between the first rail length and the second rail length with increasing amounts of rotation of the first rail end with respect to the second rail end.

19. The linear actuator of any preceding embodiment, wherein the rungs are allowed to spin freely with respect to the first and second rails.

20. A method of linear actuation between a first point and a second point, comprising: forming a ladder-like compliant structure comprising a first rail separated from a second rail by a plurality of rungs, the ladder-like structure having a first rail end and a second rail end; applying a torsional force on either the first rail end or second rail end to affect rotation of the first rail end with respect to the second rail end; and wherein, upon said rotation, the first and second rails deform such that the ladder-like structure compresses into a double-helix structure to affect translation of the first rail from the first point to the second point.

21. The method of any preceding embodiment, wherein the first and second rails are shaped to allow for elastic torsional deformation of the rails upon application of a torsional force.

22. The method of any preceding embodiment, wherein the rails comprise a compliant material to allow for elastic torsional deformation of the rails upon application of a torsional force.

23. The method of any preceding embodiment, wherein first rail end incrementally translates along a linear path from the first point to the second point in response to increasing amounts of rotation of the first rail end with respect to the second rail end.

24. The method of any preceding embodiment, wherein a rate of incremental translation of the first rail end is tunable by modifying the length of the plurality of rungs.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural, chemical, and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A linear actuator, comprising:
   first and second elongate, compliant rails; and
   a plurality of rungs disposed perpendicular to and in between the first and second rails;
   wherein each of the plurality of rungs has a first end coupled to the first rail and a second end coupled to the second rail such that the first and second rails are spaced apart parallel to each other to form a ladder-like structure having a first rail end and a second rail end and a rail length there between; and
   wherein application of a torsional force on either the first rail end or second rail end to rotate of the first rail end with respect to the second rail end deforms the first and second rails such that they form a double-helix structure to shorten the rail length of the ladder-like structure.

2. The linear actuator of claim 1, wherein the first and second rails comprise elongate planer sheets having a width much smaller than the length, and a thickness configured to allow elastic torsional deformation of the rails upon application of the torsional force.

3. The linear actuator of claim 2:
   wherein the first and second rails comprise through holes at the locations of the plurality of rungs; and
   wherein a plurality of fasteners are disposed into the through holes to attach the rungs to the first and second rails.

4. The linear actuator of claim 3, wherein the plurality of rungs comprise cylindrical members.

5. The linear actuator of claim 4, wherein the each of the plurality of rungs comprises an aperture at each end for receiving one of the plurality of fasteners.

6. The linear actuator of claim 1, wherein the rails comprise a compliant material to allow for elastic torsional deformation of the rails upon application of the torsional force.

7. The linear actuator of claim 1, wherein the plurality of rungs comprise substantially rigid structures.

8. The linear actuator of claim 1, wherein an amount of shortening of the rail length per rotation of the first end with respect to the second end is tunable by modifying the length of the plurality of rungs.

9. The linear actuator of claim 1, wherein the rail length is configured to be incrementally shortened upon increasing amounts of rotation of the first rail end with respect to the second rail end.

10. A linear actuator, comprising:
    a first rail separated from a second rail by a plurality of rungs;
    wherein each of the plurality of rungs has a first end coupled to the first rail and a second end coupled to the second rail such that the first and second rails are spaced apart parallel to each other to form a ladder-like structure having a first rail end and a second rail end, the first rail end and a second rail end establishing a rail length there between;
    wherein the ladder-like structure comprises a first free state comprising a first rail length and a second compressed state comprising a second rail length smaller than the first rail length; and
    wherein the rails are compliant such that application of a torsional force on either the first rail end or second rail end in the first free state to rotate of the first rail end with respect to the second rail end deforms the first and second rails such that they compress into a double-helix structure having the second rail length.

11. The linear actuator of claim 10, wherein the first and second rails comprise elongate planer sheets having a width much smaller than the length, and a thickness configured to allow elastic torsional deformation of the rails upon application of the torsional force.

12. The linear actuator of claim 11:
    wherein the first and second rails comprise through holes at the locations of the plurality of rungs; and
    wherein a plurality of fasteners are disposed into the through holes to attach the rungs to the first and second rails.

13. The linear actuator of claim 12, wherein the plurality of rungs comprise cylindrical members.

14. The linear actuator of claim 13, wherein the each of the plurality of rungs comprises an aperture at each end for receiving one of the plurality of fasteners.

15. The linear actuator of claim 10, wherein the rails comprise a compliant material to allow for elastic torsional deformation of the rails upon application of the torsional force.

16. The linear actuator of claim 10, wherein the plurality of rungs comprise substantially rigid structures.

17. The linear actuator of claim 10, wherein an amount of shortening between the first length and second rail length per rotation of the first end with respect to the second end is tunable by modifying the length of the plurality of rungs.

18. The linear actuator of claim 10, wherein the rail length incrementally decreases between the first rail length and the second rail length with increasing amounts of rotation of the first rail end with respect to the second rail end.

19. The linear actuator of claim 10, wherein the rungs are allowed to spin freely with respect to the first and second rails.

* * * * *